(12) United States Patent
Lee

(10) Patent No.: US 7,595,832 B2
(45) Date of Patent: Sep. 29, 2009

(54) METHOD OF CONTROLLING DIGITAL IMAGE PROCESSING APPARATUS FOR CONVENIENT REPRODUCTION

(75) Inventor: Myung-hun Lee, Seoul (KR)

(73) Assignee: Samsung Digital Imaging Co., Ltd., Suwon-si (KR)

(*) Notice: Subject to any disclaimer, the term of this patent is extended or adjusted under 35 U.S.C. 154(b) by 771 days.

(21) Appl. No.: 11/073,965

(22) Filed: Mar. 7, 2005

(65) Prior Publication Data

US 2005/0264667 A1    Dec. 1, 2005

(30) Foreign Application Priority Data

May 27, 2004   (KR) ................ 10-2004-0037658

(51) Int. Cl.
*H04N 5/222* (2006.01)
(52) U.S. Cl. .............. 348/333.01; 348/231.8; 348/231.9; 348/231.2; 358/909.1
(58) Field of Classification Search ............ 348/333.01, 348/231.8, 231.9, 231.2; 358/909.1
See application file for complete search history.

(56) References Cited

U.S. PATENT DOCUMENTS

| | | | | |
|---|---|---|---|---|
| 5,067,029 A | * | 11/1991 | Takahashi | 386/38 |
| 5,790,193 A | * | 8/1998 | Ohmori | 348/375 |
| 5,978,016 A | * | 11/1999 | Lourette et al. | 348/64 |
| 5,986,700 A | * | 11/1999 | Wakui | 348/231.8 |
| 6,097,431 A |  | 8/2000 | Anderson et al. | |
| 6,441,854 B2 | * | 8/2002 | Fellegara et al. | 348/333.13 |
| 6,519,003 B1 | * | 2/2003 | Swayze | 348/375 |
| 6,661,454 B1 | * | 12/2003 | Hwang et al. | 348/231.1 |
| 6,686,958 B1 | * | 2/2004 | Watanabe et al. | 348/231.1 |
| 7,236,193 B2 | * | 6/2007 | Suemoto et al. | 348/231.8 |
| 7,365,782 B2 | * | 4/2008 | Tanaka | 348/220.1 |
| 2001/0004268 A1 |  | 6/2001 | Kubo et al. | |
| 2001/0030706 A1 | * | 10/2001 | Miller et al. | 348/333.05 |
| 2001/0043277 A1 | * | 11/2001 | Tanaka et al. | 348/333.01 |
| 2004/0145863 A1 | * | 7/2004 | Son | 361/683 |
| 2005/0093988 A1 | * | 5/2005 | Haas et al. | 348/220.1 |

FOREIGN PATENT DOCUMENTS

KR    U1999-012580 A    4/1999

* cited by examiner

*Primary Examiner*—David L Ometz
*Assistant Examiner*—Quang V Le
(74) *Attorney, Agent, or Firm*—Drinker Biddle & Reath LLP (57) ABSTRACT

Provided is a method of controlling a digital image processing apparatus that, in response to input button signals generated by a user, selectively reproduces files stored in a plurality of storage mediums. The method includes (a) reproducing a next file after a file currently being reproduced in a storage medium if a first input button signal is generated; (b) reproducing a previous file before the file currently being reproduced in the storage medium if a second input button signal is generated; and (c) reproducing a file in a storage medium different from the storage medium of the file currently being reproduced if a third input button signal is generated.

17 Claims, 6 Drawing Sheets

METHOD OF CONTROLLING DIGITAL IMAGE PROCESSING APPARATUS FOR CONVENIENT REPRODUCTION

BACKGROUND OF THE INVENTION

This application claims the priority of Korean Patent Application No. 10-2004-0037658, filed on May 27, 2004, in the Korean Intellectual Property Office, the disclosure of which is incorporated herein in its entirety by reference.

1. Field of the Invention

The present invention relates to a method of controlling a digital image processing apparatus. More particularly, the invention relates to a method of controlling a digital image processing apparatus that selectively reproduces files stored in a plurality of storage mediums in response to input button signals generated by a user.

2. Description of the Related Art

With the development of digital image processing apparatuses, for example, digital cameras, users can store files in a plurality of storage mediums. However, when a conventional digital image processing apparatus is used, files stored in a storage medium are sequentially reproduced in response to signals generated by two input buttons, for example, a right button and a left button. Accordingly, it takes a lot of time for a user to switch to another storage medium.

A conventional digital image processing apparatus disclosed in U.S. Pat. No. 6,097,431, "Method and System for Reviewing and Navigating among Images on an Image Capture Unit," discloses a method of reproducing data from a single recording medium using a conventional digital image processing apparatus.

SUMMARY OF THE INVENTION

Various embodiments of the present invention provide a method of controlling a digital image processing apparatus that enables a user to quickly retrieve files stored in a plurality of storage mediums in a reproduction mode.

According to an embodiment of the present invention, there is provided a method of controlling a digital image processing apparatus that selectively reproduces files stored in a plurality of storage mediums in response to input button signals generated by a user. The method includes (a) if a first input button signal is generated, reproducing a next file after a file currently being reproduced in a storage medium; (b) if a second input button signal is generated, reproducing a previous file before the file currently being reproduced in the storage medium; (c) if a third input button signal is generated, reproducing a file in a storage medium different from the storage medium of the file currently being reproduced; and (d) if the user generates a fourth input button signal, a last file in a storage medium of a file currently being reproduced is reproduced.

Thus, in the method, when a user generates a third input button signal, a storage medium from which files are to be reproduced is changed. As a result, in a reproduction mode, the user can quickly retrieve files stored in a plurality of storage mediums.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
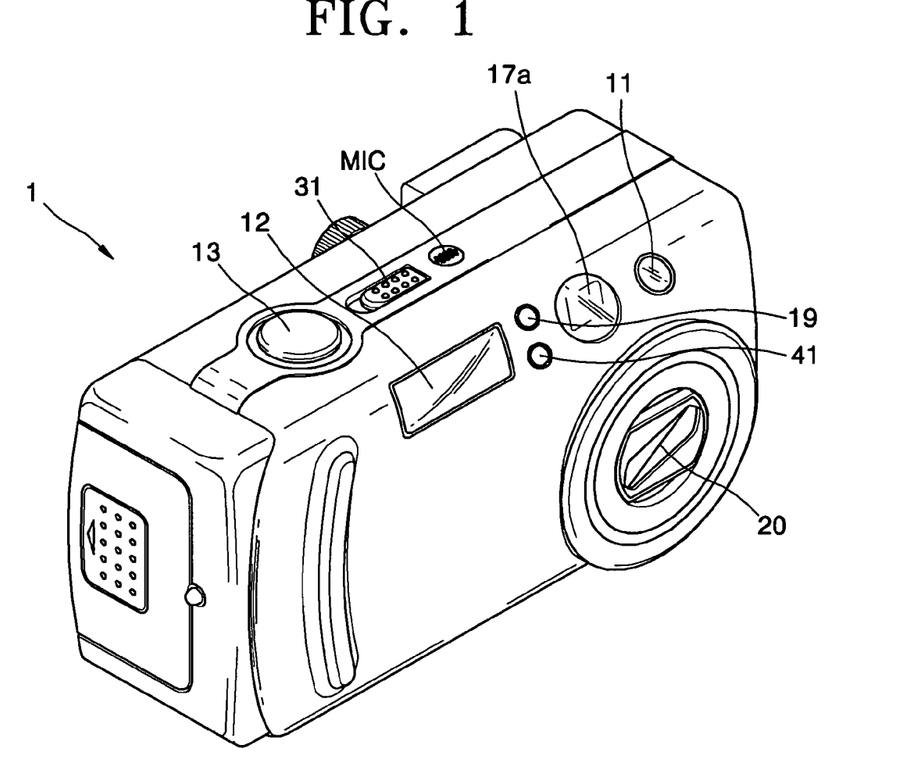
FIG. 1 is a perspective view illustrating the front and the top of an embodiment of a digital camera according to the present invention.

Referring to FIG. 1, the front part of a digital camera 1 according to an embodiment of the present invention includes a microphone MIC, a self-timer lamp 11, a flash 12, a shutter release button 13, a viewfinder 17a, a flash light intensity sensor 19, a power switch 31, a lens unit 20, and a remote receiver 41.

In a self-timer mode, the self-timer lamp 11 operates for a set period of time from the time when the shutter release button 13 is pressed to the time when an image starts to be captured. When the flash 12 operates, the flash light intensity sensor 19 senses the intensity of the light generated by the flash 12 and relays the sensed intensity of the light to a digital camera processor (DCP) 507 of FIG. 3 via a micro-controller 512 of FIG. 3. The remote receiver 41 receives command signals, for example, a photographing command signal, from a remote controller (not shown) and relays the photographing command signal to the DCP 507 via the micro-controller 512.

The shutter release button 13 has two levels. When a user lightly depresses the shutter release button 13 to a first level, a first level signal S1 from the shutter release button 13 is turned on. When the user fully depresses the shutter release button 13 to a second level, a second level signal S2 from the shutter release button 13 is turned on.

Figure 2:
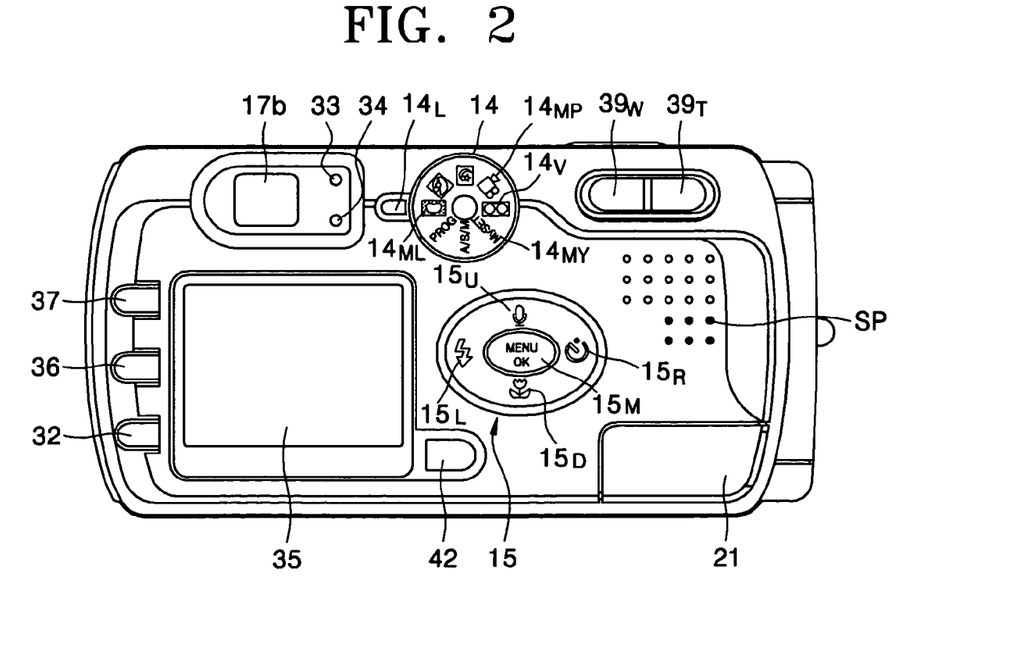
FIG. 2 is a perspective view illustrating the back of the digital camera of FIG. 1.

Referring to FIG. 2, the back of the digital camera 1 according to an embodiment of the present invention includes a mode dial 14, functional buttons 15, a manual focus/delete button 36, a manual adjust/reproduce button 37, a reproduction mode button 42, a speaker SP, a monitor button 32, an automatic focusing lamp 33, a viewfinder 17b, a flash standby lamp 34, a color LCD panel 35, a wide-angle zoom button $39_W$, a telephoto zoom button $39_T$, and an external interface unit 21.

The mode dial 14 is used for selecting and setting the operating modes of the digital camera 1, such as a synthesized photographing mode $14_{ML}$, a program photographing mode, a character photographing mode, a night view photographing mode, a manual photographing mode, a moving-image photographing mode $14_{MP}$, a user-setting mode $14_{MY}$, and an audio recording mode $14_V$.

The synthesized photographing mode $14_{ML}$ is for synthesizing an input image and a supporting image. The user-setting mode $14_{MY}$ is an operating mode in which a user selects photograph-taking settings for a still-image or moving-image photographing mode. The audio recording mode $14_V$ is for recording only sounds, for example, a user's voice.

The functional buttons 15 are used for operating specific functions of the digital camera 1. The functional buttons 15 are also used as control buttons to manage the movement of an active cursor on the menu screen of the color LCD panel 35.

In addition, the functional buttons 15 are used to change a file and a storage medium to be reproduced.

Specifically, in a preview mode, a user may set automatic proximity focusing by pressing a macro/down button $15_D$. Also, after a user has pressed a menu/select-confirm button $15_M$, the macro/down button $15_D$ can be used to move the cursor down. If the user presses the menu/select-confirm button $15_M$ again when the active cursor is on a menu item, an operation corresponding to the menu item is performed.

Figure 7:
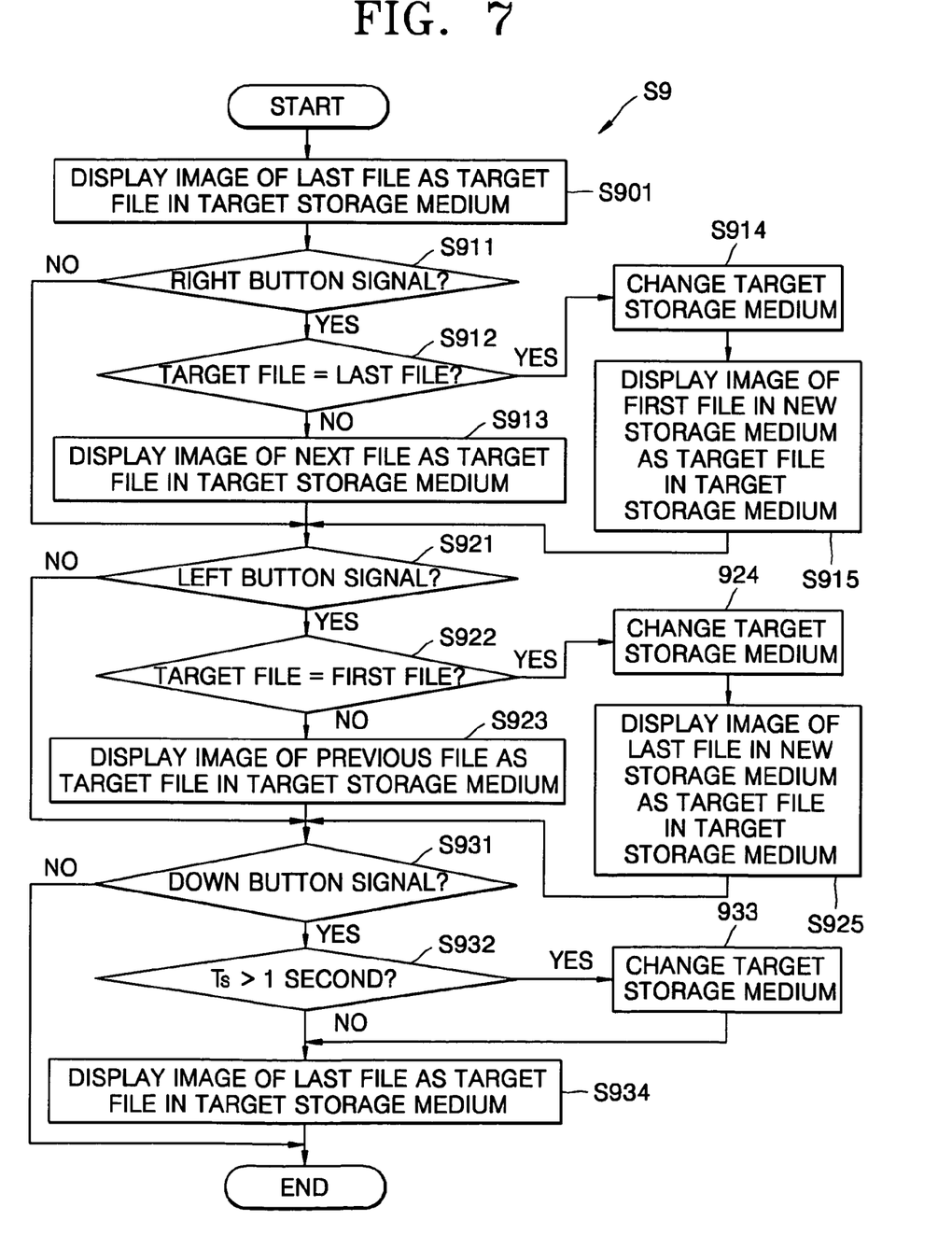
FIG. 7 is a flowchart illustrating an embodiment of the reproduction mode program of FIG. 4.

In a reproduction mode, when the user presses the macro/down button $15_D$ for more than one second, a storage medium from which files are to be reproduced, for example, a memory card, is changed to another storage medium and a last file stored in the new storage medium is displayed (see S932 through S934 of FIG. 7). When the user presses the macro/down button $15_D$ for less than one second, a last file stored in a current storage medium from which files are to be reproduced is displayed (see S932 through S934 of FIG. 7). Thus, in the reproduction mode, the user can quickly retrieve files stored in a plurality of storage mediums.

In the preview mode, when a user presses a voice-memo/up button $15_U$, a 10-second audio recording is possible upon consecutive photographing. Also, after the user has pressed the menu/select-confirm button $15_M$, the voice-memo/up button $15_U$ can be used to move the cursor up. If the user presses the menu/select-confirm button $15_M$ again when the active cursor is on a menu item, an operation corresponding to the menu item is performed.

In preview mode, the user can set the self-timer mode or a remote control mode by pressing the self-timer/right button $15_R$. When the self-timer mode is set, the shutter release button 13 is pressed to the second level and a photographing operation is performed after a set period of time. When the remote controller mode is set, the user can take a photograph using the shutter release button 13 including the remote controller (not shown). After selecting a specific option from the menu/select-confirm button $15_M$, the user can press the self-timer/right button $15_R$ and move the cursor to the right. In the reproduction mode, when the user presses the self-timer/right button $15_R$, a file to be reproduced is changed to a next file (See S911 through S915 of FIG. 7).

In the preview mode, the user can set the flash mode by pressing the flash/left button $15_L$. After selecting a specific option from the menu/select-confirm button $15_M$, the user can press the flash/left button $15_L$ and move the cursor to the left. In the reproduction mode, when the user presses the flash/left button $15_L$, a file to be reproduced is changed to a next file (See S921 through S925 of FIG. 7).

When the digital camera is in a photographing mode, the manual focus/delete button 36 is used for manually focusing or deleting. In the reproduction mode, the manual adjust/reproduce button 37 is used for manual adjustment of specified conditions and for stopping or reproducing. The reproduction mode button 42 is used for converting into the reproduction or preview mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the reproduction mode, when the user presses the monitor button 32 while an image file is being reproduced, photographing information about the image file is displayed on the color LCD panel 35. When the user presses the monitor button 32 again, only pure images are displayed.

The automatic focusing lamp 33 operates when the focus of a lens is well-adjusted. The flash standby lamp 34 operates when the flash 12 of FIG. 1 is in a standby mode. A mode indicating lamp $14_L$ indicates a selection mode of the mode dial 14.

Figure 3:
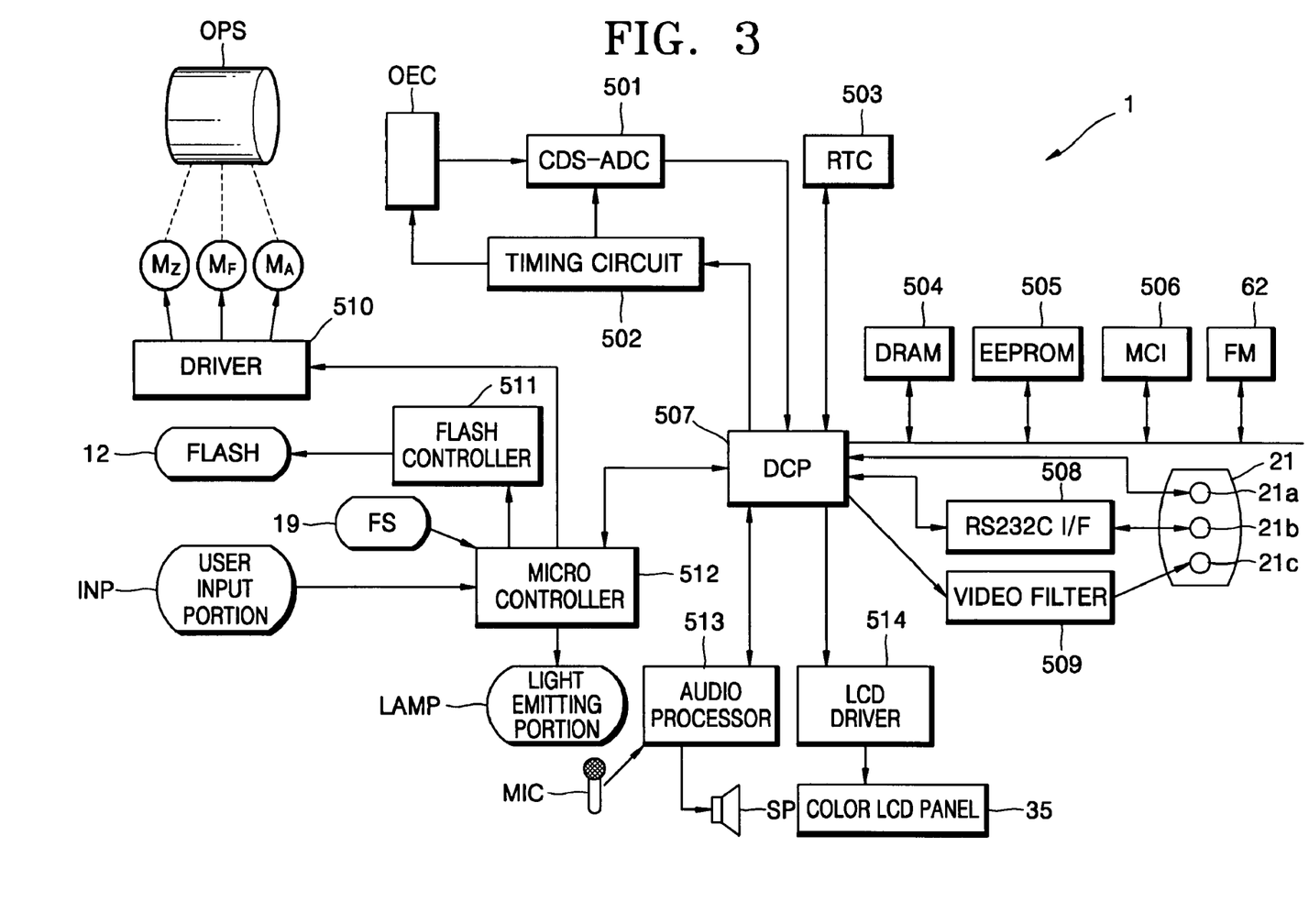
FIG. 3 is a schematic diagram of the configuration of the digital camera of FIG. 1.

FIG. 3 is a schematic diagram of the configuration of the digital camera 1 of FIG. 1. The configuration and operation of the digital camera 1 of FIG. 1 will be described below with reference to FIGS. 1 through 3.

An optical system (OPS) including the lens unit 20 and a filter unit (not shown) optically processes light. The lens unit 20 of the OPS includes a zoom lens, a focal lens, and a compensation lens.

When the user presses the wide-angle zoom button $39_W$ or the telephoto zoom button $39_T$ included in a user input portion (INP), a signal corresponding to the wide-angle zoom button $39_W$ or the telephoto zoom button $39_T$ is relayed to the micro-controller 512. The micro-controller 512 controls a driver 510, thereby running a zoom motor $M_Z$, which in turn, moves the zoom lens. In other words, when the user presses the wide-angle zoom button $39_W$, the focal length of the zoom lens becomes short, thereby widening the angle of view. When the user presses the telephoto zoom button $39_T$, the focal length of the zoom lens becomes long, thereby narrowing the angle of view. Since the position of the focal lens is adjusted in a state where the position of the zoom lens is set, the angle of view is hardly affected by the position of the focal lens.

In the automatic focusing mode, a main controller built into the DCP 507 controls the driver 510 through the micro-controller 512, thereby driving a focus motor $M_F$. Accordingly, when the focal lens is moved, the position of the focal lens, for example, a number of driving steps of the focus motor $M_F$, having a largest high frequency component of an image signal is set. Reference numeral $M_A$ indicates a motor for driving an aperture (not shown).

A photoelectric conversion unit (OEC) of a charge coupled device or a complementary metal oxide (CMOS) semiconductor converts light from the OPS into an analog electrical signal. Here, the DCP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise, adjusts amplitude, and then converts the analog signal into a digital signal that is received by the DCP 507.

A real-time clock (RTC) 503 provides time information to the DCP 507. The DCP 507 processes the digital signal from the CDS-ADC 501 and generates a digital image composed of luminance and chromaticity values.

A light emitting portion (LAMP) is operated by the micro-controller 512 in response to a control signal generated by the DCP 507 including the main controller. The light emitting portion (LAMP) includes the self-timer lamp 11, the automatic focusing lamp 33, the mode indicating lamp $14_L$, and the flash standby lamp 34. The INP includes the shutter release button 13, the mode dial 14, the functional buttons 15, the monitor button 32, the manual focus/delete button 36, the manual adjust/reproduce button 37, the wide-angle zoom button $39_W$, the telephoto zoom button $39_T$, and the reproduction mode button 42.

A dynamic random-access memory (DRAM) 504 temporarily stores a digital image signal from the DCP 507. An electrically erasable and programmable read-only memory (EEPROM) 505 stores programs and setting data. A flash memory (FM) 62 stores setting data required to operate the DCP 507. A plurality of memory cards which are used as a user's storage medium may be inserted or removed in the memory card interface (MCI) 506.

The digital image signal from the DCP 507 is input to an LCD driver 514, thereby displaying an image on the color LCD panel 35.

The digital image signal from the DCP 507 can be transmitted as serial communications via a universal serial bus (USB) connector 21a or via an RS232C interface 508 and an RS232C connector 21b. The digital image signal from the DCP 507 can also be transmitted as a video signal via a video filter 509 and a video output unit 21c.

An audio processor 513 can relay sound from the microphone MIC to the DCP 507 or to the speaker SP. In addition, the audio processor 513 can output an audio signal from the DCP 507 to the speaker SP. The micro-controller 512 controls the operation of a flash controller 511 in response to a signal from the flash light intensity sensor (FS) 19, thereby driving the flash 12.

Figure 4:
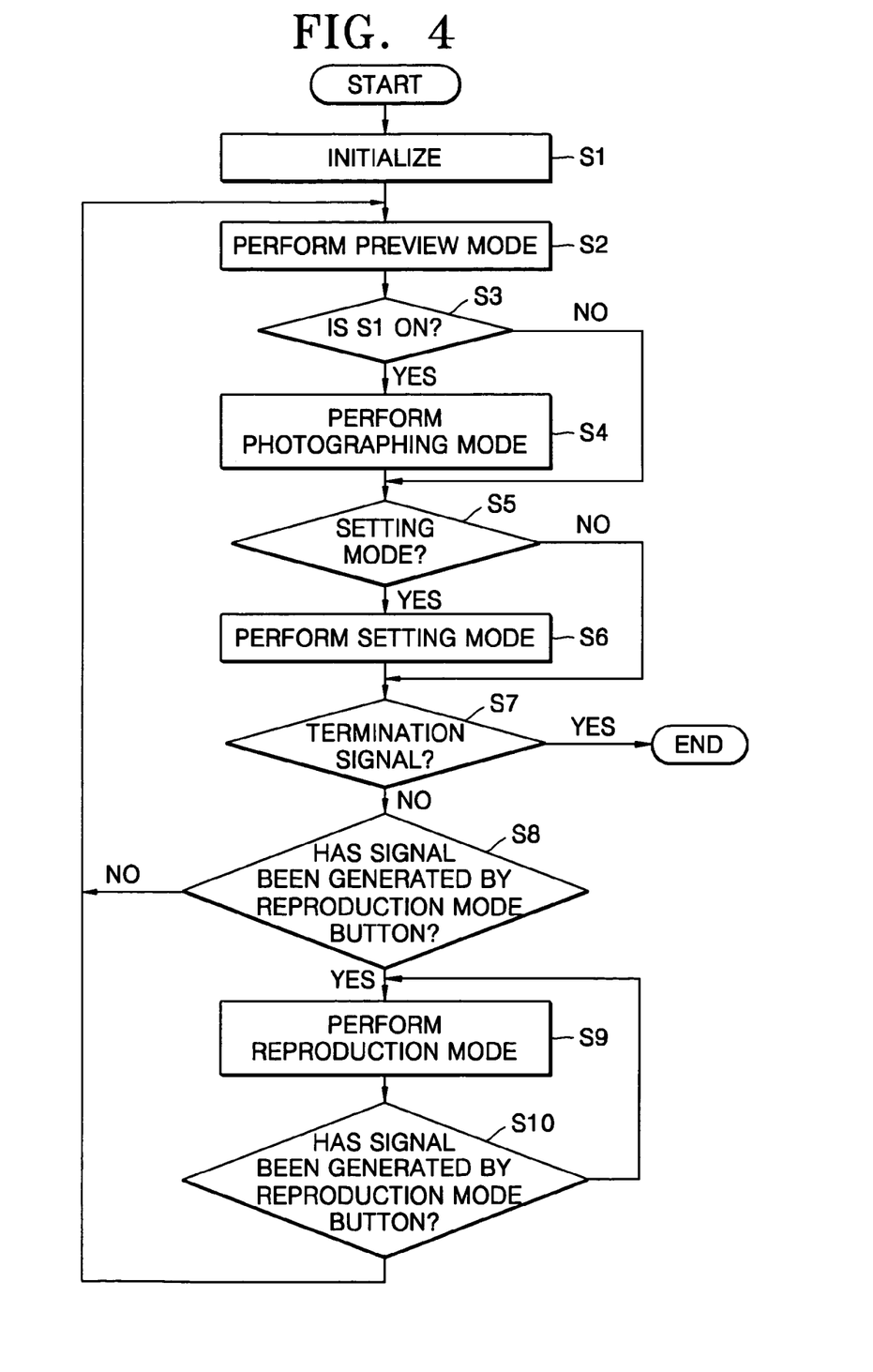
FIG. 4 is a flowchart illustrating a main program of a digital camera processor (DCP) of FIG. 3.

FIG. 4 is a flowchart illustrating a main program of the DCP 507 illustrated in FIG. 3. The main program of the DCP 507 will be described below with reference to FIGS. 1 through 4.

When power is applied to the digital camera 1, the DCP 507 is initialized (S1). After the initialization (S1), the DCP 507 performs the preview mode (S2). In the preview mode, an input image is displayed on the color LCD panel 35. Operations related to the preview mode will be described in detail later with reference to FIG. 5.

When the first level signal S1 from the shutter release button 13 is on (S3), the DCP 507 performs the photographing mode (S4). An embodiment of a photographing mode (S4) program will be described in detail later with reference to FIG. 6.

When INP-generated signals corresponding to a setting mode are input (S5), a setting mode for setting an operating condition in response to the input signals from the INP is performed (S6). When a termination signal is not generated, the DCP 507 continues to perform the following operations (S7).

When a signal is generated by the reproduction mode button 42 in the INP (S8), the reproduction mode is performed (S9). In the reproduction mode, files stored in a plurality of storage mediums, for example, in more than one memory card, are selectively reproduced in response to the input signals from the INP. An embodiment of the reproduction mode (S9) program will be described in detail later with reference to FIG. 7.

When a signal is generated by the reproduction mode button 42 again (S10), the above operations are repeated.

Figure 5:
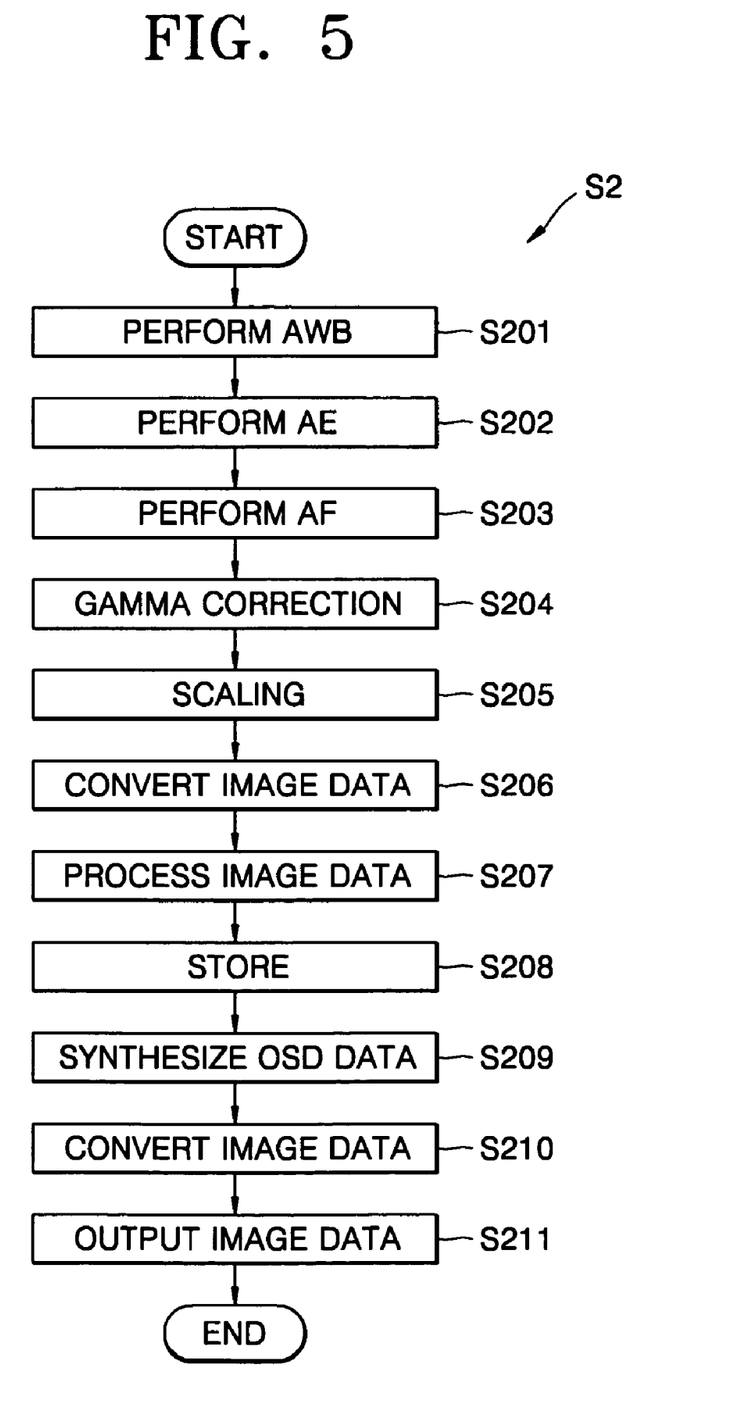
FIG. 5 is a flowchart illustrating an embodiment of the preview mode program of FIG. 4.

FIG. 5 illustrates an embodiment of the preview mode (S2) of FIG. 4. The preview mode (S2) program will now be described with reference to FIGS. 1 through 3 and FIG. 5.

The DCP 507 performs automatic white balancing (AWB) and sets parameters related to the white balance (S201). In the automatic exposure (AE) mode (S202), the DCP 507 calculates the exposure by measuring incident luminance, drives the aperture driving motor $M_A$ according to the calculated exposure, and sets a shutter speed (S203).

The DCP 507 performs gamma correction on input image data (S204) and scales the gamma corrected image data to meet display standards (S205). The DCP 507 converts the scaled input image data from an RGB (red, green, and blue) format into a luminance-chromaticity format (S206). The DCP 507 processes the input image data depending on resolution and where the input image data is displayed and filters the input image data (S207).

The DCP 507 temporarily stores the input image data in the DRAM 504 of FIG. 3 (S208). The DCP 507 synthesizes the data temporarily stored in the DRAM 504 of FIG. 3 and on-screen display (OSD) data (S209). The DCP 507 converts the synthesized image data from the RGB format into the luminance-chromaticity format (S210) and outputs the image data in the converted format via the LCD driver 514 of FIG. 3 (S211).

Figure 6:
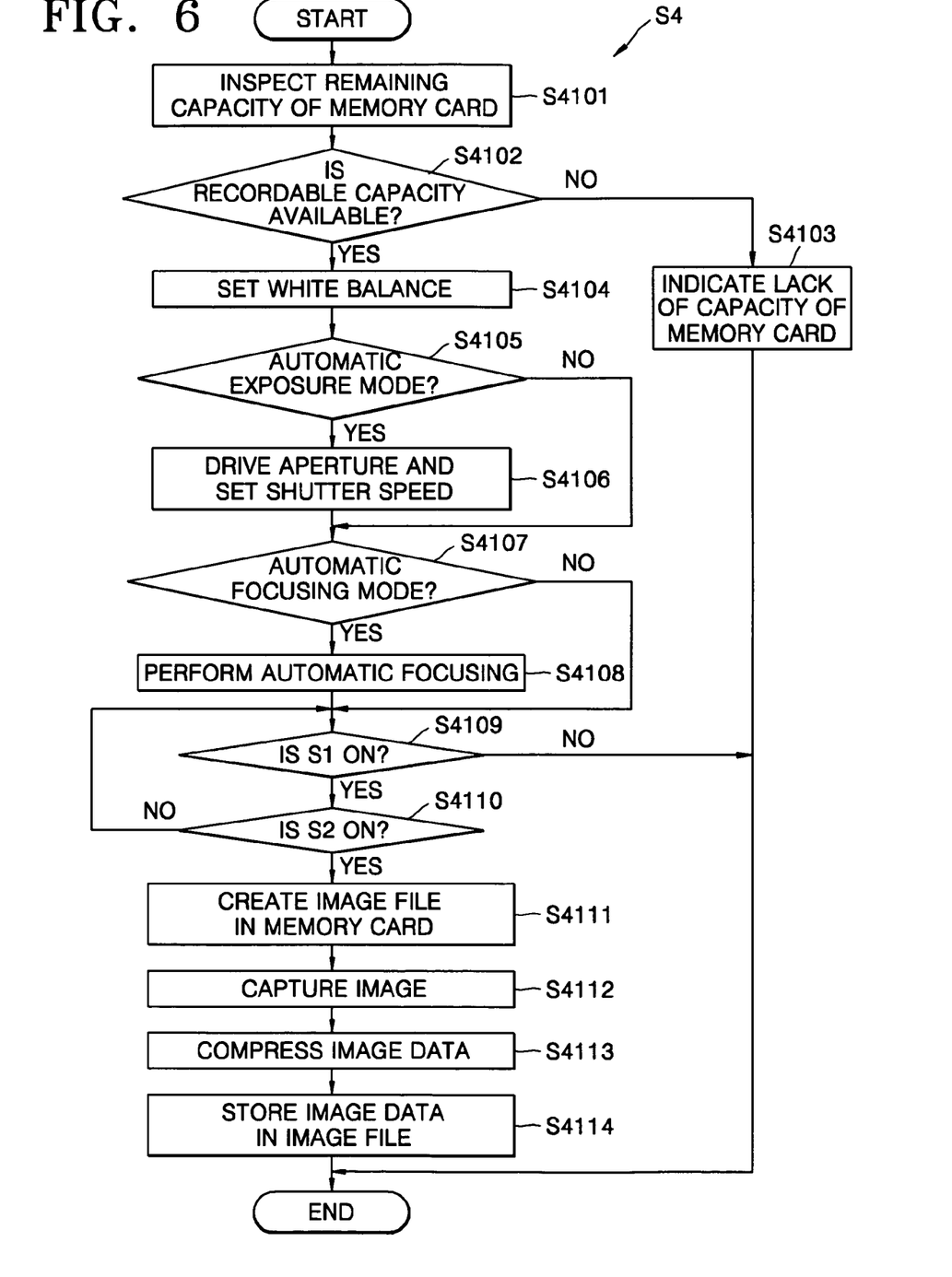
FIG. 6 is a flowchart illustrating an embodiment of the photographing mode program of FIG. 4.

FIG. 6 illustrates an embodiment of the photographing mode (S4) of FIG. 4. The photographing mode (S4) program will be described with reference to FIGS. 1 through 3 and FIG. 6. The photographing mode program starts when the first level signal S1 from the shutter release button 13 is turned on (see S3 of FIG. 4). Here, the current position of the zoom lens is already set.

The DCP 507 inspects the remaining recording space in the memory card (S4101) and determines whether the memory card has enough space for recording a digital image signal (S4102). When the memory card does not have enough recording space, the DCP 507 indicates the lack of space of the memory card and terminates the photographing mode (S4103). When the memory card has enough recording space, the following operations are performed.

The DCP 507 sets white balance according to a present photographing condition and sets parameters related to the white balance (S4104). In the automatic exposure (AE) mode (S4105), the DCP 507 calculates the exposure by measuring incident luminance, drives the aperture driving motor $M_A$ according to the calculated exposure, and sets a shutter speed (S4106). In the automatic focusing mode (S4107), the DCP 507 performs automatic focusing and drives the focal lens (S4108). When the first level signal S1 from the shutter release button 13 is on (S4109), the DCP 507 performs the following operations.

The DCP 507 identifies whether the second level signal S2 is on (S4110). When the second level signal S2 is not on, it means that the user did not press the shutter release button 13 to the second level to take a photograph. Then, the DCP 507 repeats operations S4109 through S4110.

When the second level signal S2 is on, it means that the user fully depressed the shutter release button 13 to the second level. The DCP 507 creates an image file in the memory card (S4111). Next, the DCP 507 captures an image (S4112). In other words, the DCP 507 receives image data from the CDS-ADC 501. Then, the DCP 507 compresses the received image data (S4113). The DCP 507 stores the compressed image data in the image file (S4114).

FIG. 7 is a flowchart illustrating an embodiment of the reproduction mode (S9) of FIG. 4. The reproduction mode (S9) program will now be described with reference to FIGS. 4 and 7.

When the reproduction mode (S9) starts, the DCP 507 displays an image of a last file on the color LCD panel 35 as a target file in a target storage medium (S901). Here, the last file denotes a most-recently stored file from a group of files to be reproduced which are stored in the target storage medium. When referring to the files stored in a target storage medium, the first file is the earliest-stored file and the last or terminal file is the most recently stored file.

When the user presses the self-timer/right button 15$_R$ and generates a right button signal (S911), the DCP 507 determines whether the target file being reproduced is a last file in the target storage medium (S912). If the target file currently being reproduced is not the last file, the DCP 507 displays an image of a next file on the color LCD panel 35 as a target file in the target storage medium (S913). Here, the next file denotes a file that has been stored after the target file currently being reproduced. If the target file currently being reproduced is the last file in the target storage medium, the DCP changes the storage medium to another storage medium (S914) and displays an image of a first file in the new storage medium on the color LCD panel 507 as a target file in a target storage medium (S915).

When the user presses the flash/left button 15$_L$ and generates a left button signal (S921), the DCP 507 determines whether the target file being reproduced is a first file in the target storage medium (S922). Here, the first file denotes a file that has been stored first out of files stored in the target storage medium. If the target file currently being reproduced is not the first file, the DCP 507 displays an image of a previous file on the color LCD panel 35 as a target file in the target storage medium (S923). Here, the previous file denotes a file that has been stored before the target file currently being reproduced. If the target file currently being reproduced is the first file, the DCP changes the storage medium to another storage medium (S924) and displays an image of a last file in the new storage medium on the color LCD panel 507 as a target file in a target storage medium (S925).

When the user presses the macro/down button 15D and generates a down button signal (S931), the DCP 507 determines whether input time $T_S$ of the down button signal is longer than one second (S932). If it is determined that the input time Ts of the down button signal is longer than one second, the DCP 507 changes the storage medium to another storage medium (S933) and displays an image of a last file in the new storage medium on the color LCD panel 35 as a target file in a target storage medium (S934). If it is determined that the input time $T_S$ of the down button signal is not longer than one second, the DCP 507 displays an image of a last file in the current storage medium on the color LCD panel 35 (S934). Thus, the user can quickly retrieve files stored in a plurality of storage mediums in the reproduction mode.

As described above, according to a method of controlling a digital image processing apparatus, when a user generates a third input button signal, a storage medium to be reproduced is changed. Hence, in a reproduction mode, the user can quickly retrieve files stored in a plurality of storage mediums. Additionally, when the user generates a fourth input button signal, a last file in a storage medium of a file currently being reproduced is reproduced as a target file in a target storage medium. Thus, the user can quickly retrieve files stored in a plurality of storage mediums.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital image processing apparatus that is capable of capturing a photograph, the apparatus comprising an optical system, a memory card interface, a first removable memory device, a second removable memory device, and a display screen, wherein the first removable memory device and the second removable memory device are coupled to the memory card interface, the method comprising:

retrieving an initial image from the first removable memory device;
displaying the initial image on the display screen;
detecting a user input; and
in response to the user input, retrieving a new image from the second removable memory device and replacing the initial image on the display screen with the new image from the second removable memory device only when a user presses a button for a length of time that exceeds a preset value, and retrieving the new image from the first removable memory device and replacing the initial image on the display screen with the new image from the first removable memory device only when a user presses the button for a length of time that is less than a preset value.

2. The method of claim 1, wherein the retrieved new image is a last image stored on the second removable memory device.

3. The method of claim 1, further comprising:
determining whether the initial image is the last image stored on the first removable memory device; and
if the initial image is the last image stored on the first removable memory device, the retrieved new image is a first image stored on the second removable memory device.

4. The method of claim 1, further comprising:
determining whether the initial image is a first image stored on the first removable memory device; and
if the initial image stored on the first removable memory device is the first image stored on the first removable memory device, the retrieved new image is a last image stored on the second removable memory device.

5. The method of claim 1, further comprising:
detecting a second user input; and
in response to the second user input, retrieving a new image from the first removable memory device and replacing the initial image on the display screen with the new image from the first removable memory device.

6. The method of claim 5, wherein:
the second user input is generated by a user pressing a first button for a length of time which does not exceed a preset value; and
the new image retrieved from the first removable memory device represents the photograph which was most recently stored on the first removable memory device.

7. The method of claim 5, wherein:
the second user input is generated by a user manipulating a second button; and
the new image retrieved from the first removable memory device represents the photograph captured and stored sequentially following the photograph represented by the initial image.

8. The method of claim 5, wherein:
the second user input is generated by a user manipulating a third button; and
the new image retrieved from the first removable memory device represents the photograph captured and stored sequentially preceding the photograph represented by the initial image.

9. The method of claim 1, further comprising:
receiving light from a subject to be photographed, wherein the light is received through the optical system;
converting the light received through the optical system into electric analog signals;
generating a signal representing an image of the subject; and
storing image data for the image on a first removable memory device or a second removable memory device.

10. A method of controlling a digital image processing apparatus that is capable of capturing a photograph, the apparatus comprising an optical system, a memory card interface, a first storage medium, a second storage medium, and a display screen, wherein the first storage medium and the second storage medium are coupled to the memory card interface, the method comprising:
- displaying an image of a last file;
- setting a storage medium containing the last file as a target storage medium, the target storage medium having a first file and a terminal file;
- detecting the generation of a first user input signal;
- in response to detecting the first user input signal, determining whether a displayed file is the terminal file of the target storage medium;
- if the displayed file is not the terminal file of the target storage medium, displaying an image of a next file stored in the target storage medium;
- if the displayed file is the terminal file of the target storage medium, switching to a second storage medium, setting the second storage medium to be the target storage medium, and displaying an image of a first file in the target storage medium;
- detecting the generation of a second user input signal;
- in response to detecting the second user input signal, determining whether a displayed file is the first file of the target storage medium;
- if the displayed file is not the first file of the target storage medium, displaying an image of a previous file stored in the target storage medium;
- if the displayed file is the first file of the target storage medium, switching to the second storage medium, setting the second storage medium to be the target storage medium, and displaying an image of the terminal file in the target storage medium;
- detecting the generation of a third user input signal;
- only in response to detecting the third user input signal, displaying an image of the terminal file in the target storage medium;
- detecting the generation of a fourth user input signal;
- only in response to detecting the fourth user input signal, switching to the second storage medium, setting the second storage medium to be the target storage medium, and displaying an image of the terminal file in the target storage medium; and
- wherein the third user input signal is generated by pressing the input button for a time period that does not exceed a preset value, and the fourth user input signal is generated by pressing the input button for a time period that exceeds the preset value.

11. The method of claim 10, wherein the first user input signal is generated by pressing a right directional button.

12. The method of claim 10, wherein the second user input signal is generated by pressing a left directional button.

13. The method of claim 10, wherein the preset value is one second.

14. The method of claim 10, wherein the button is a downward directional arrow.

15. The method of claim 10, further comprising:
- receiving light from a subject to be photographed, wherein the light is received through an optical system;
- converting the light received through the optical system into electric analog signals;
- generating a signal representing an image of the subject; and
- storing image data for the image in a first storage medium or a second storage medium.

16. A digital photographing apparatus, the apparatus comprising:
- an optical system that receives light from a subject to be photographed by the apparatus;
- a digital processor that receives signals representing the light received by the optical system and generates a signal representing an image of the subject;
- means for concurrently receiving at least two removable memory devices that comprise a first memory device and a second memory device;
- at least three buttons which are each capable of generating a user input signal upon manipulation by a user;
- means for detecting the user input signal;
- means for determining a duration of the user input signal; and
- a display screen capable of displaying an image of a current memory device that is one of the first and second memory device only when at least one of the three buttons is pressed for a length of time that does not exceed a preset value, and an image of an other memory device that is the other of the first and second memory device only when at least one of the three buttons is pressed for a length of time that exceeds a preset value.

17. The apparatus of claim 16, further comprising a photoelectric converter that converts light received by the optical system into electric analog signals and a correlation double sampler and analog-to-digital converter that processes the analog signals output from the photoelectric converter, removes high frequency noise from the signals, and converts the analog signals into digital signals, which are processed by the digital processor.

* * * * *

UNITED STATES PATENT AND TRADEMARK OFFICE
CERTIFICATE OF CORRECTION

PATENT NO.       : 7,595,832 B2                                            Page 1 of 1
APPLICATION NO. : 11/073965
DATED            : September 29, 2009
INVENTOR(S)      : Myung-hun Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1241 days.

Signed and Sealed this

Twenty-eighth Day of September, 2010

David J. Kappos
*Director of the United States Patent and Trademark Office*